(Model.) 3 Sheets—Sheet 1.
G. MINISINI.
AUTOMATIC POUCH FOR CARTRIDGES.
No. 457,053. Patented Aug. 4, 1891.
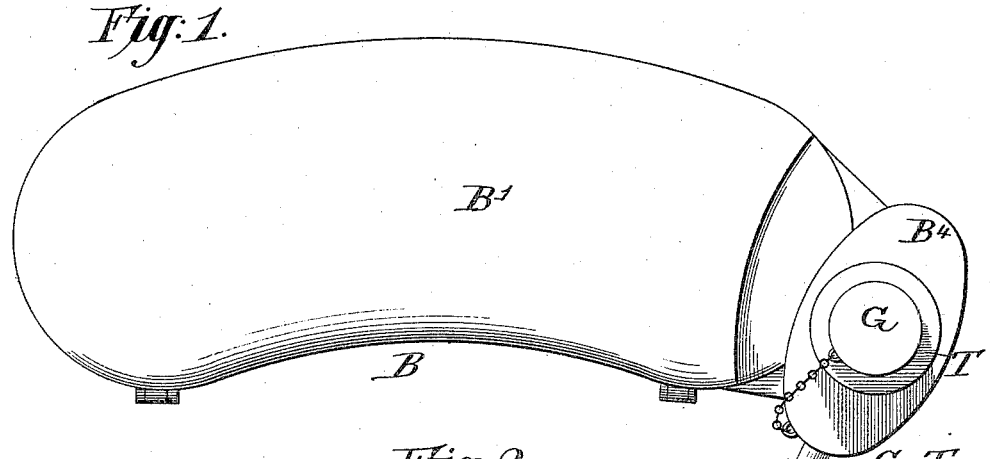
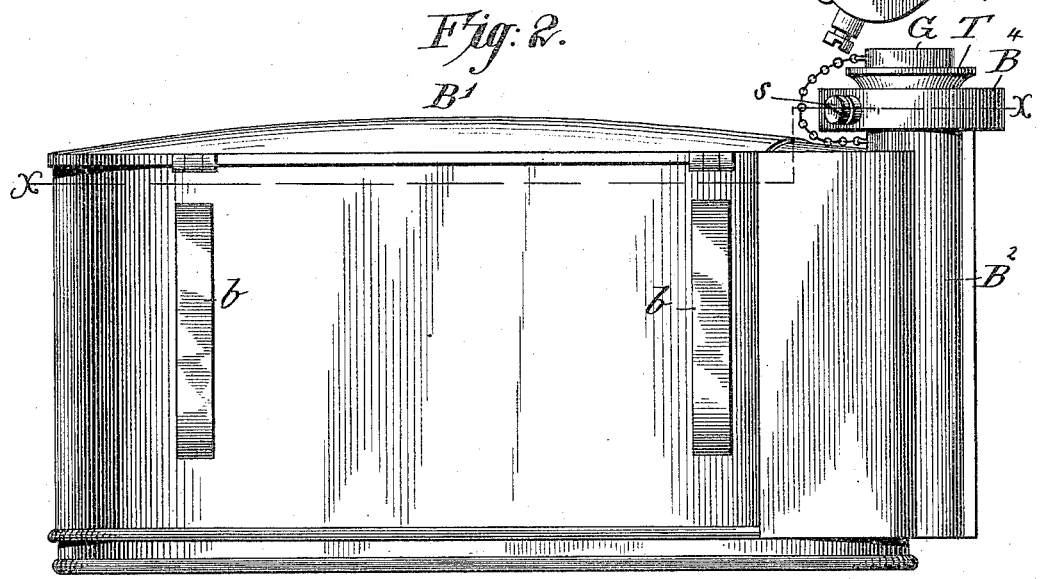
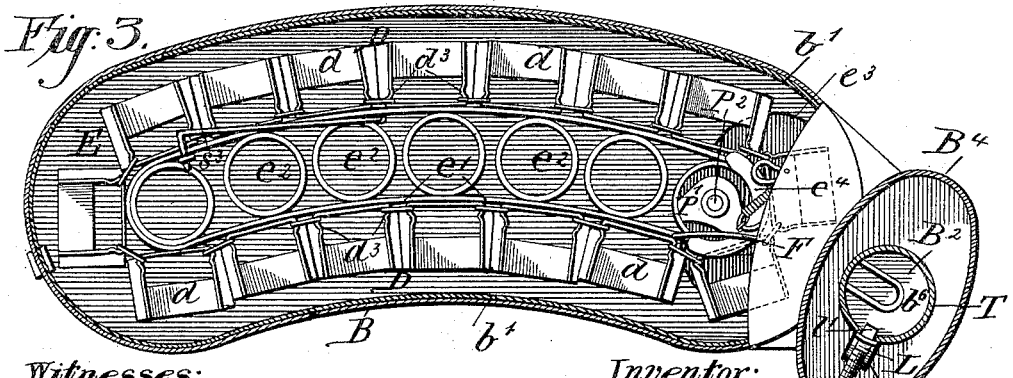
Witnesses:
H. S. Dieterich
B. W. Sommers.
Inventor:
Gaspare Minisini
Attorney:

(Model.)
G. MINISINI.
AUTOMATIC POUCH FOR CARTRIDGES.
No. 457,053.    Patented Aug. 4, 1891.
3 Sheets—Sheet 2.
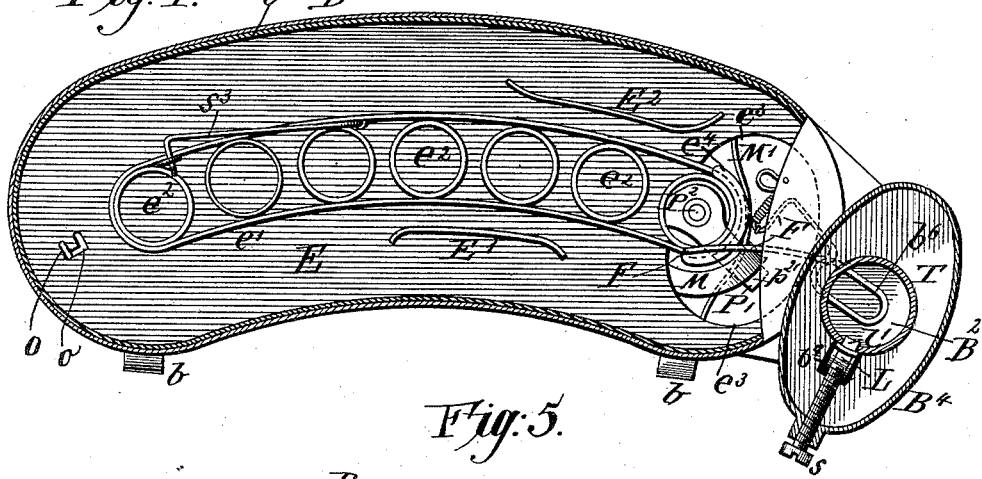
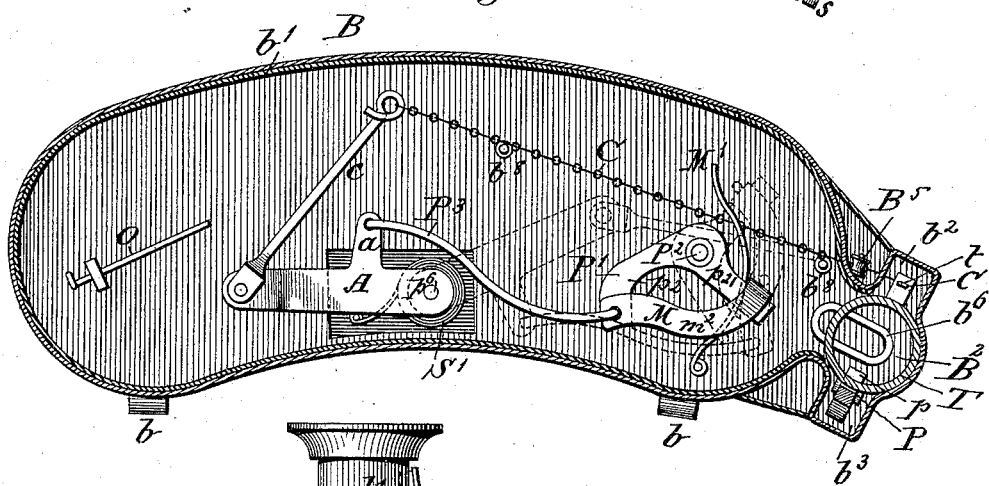
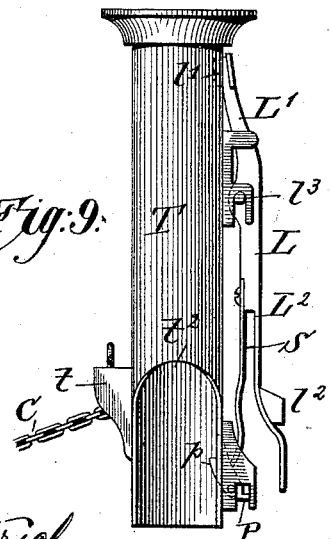
Witnesses:
H. F. Dieterich
B. H. Sommers
Inventor:
Gaspare Minisini
Henry Orth
Attorney:

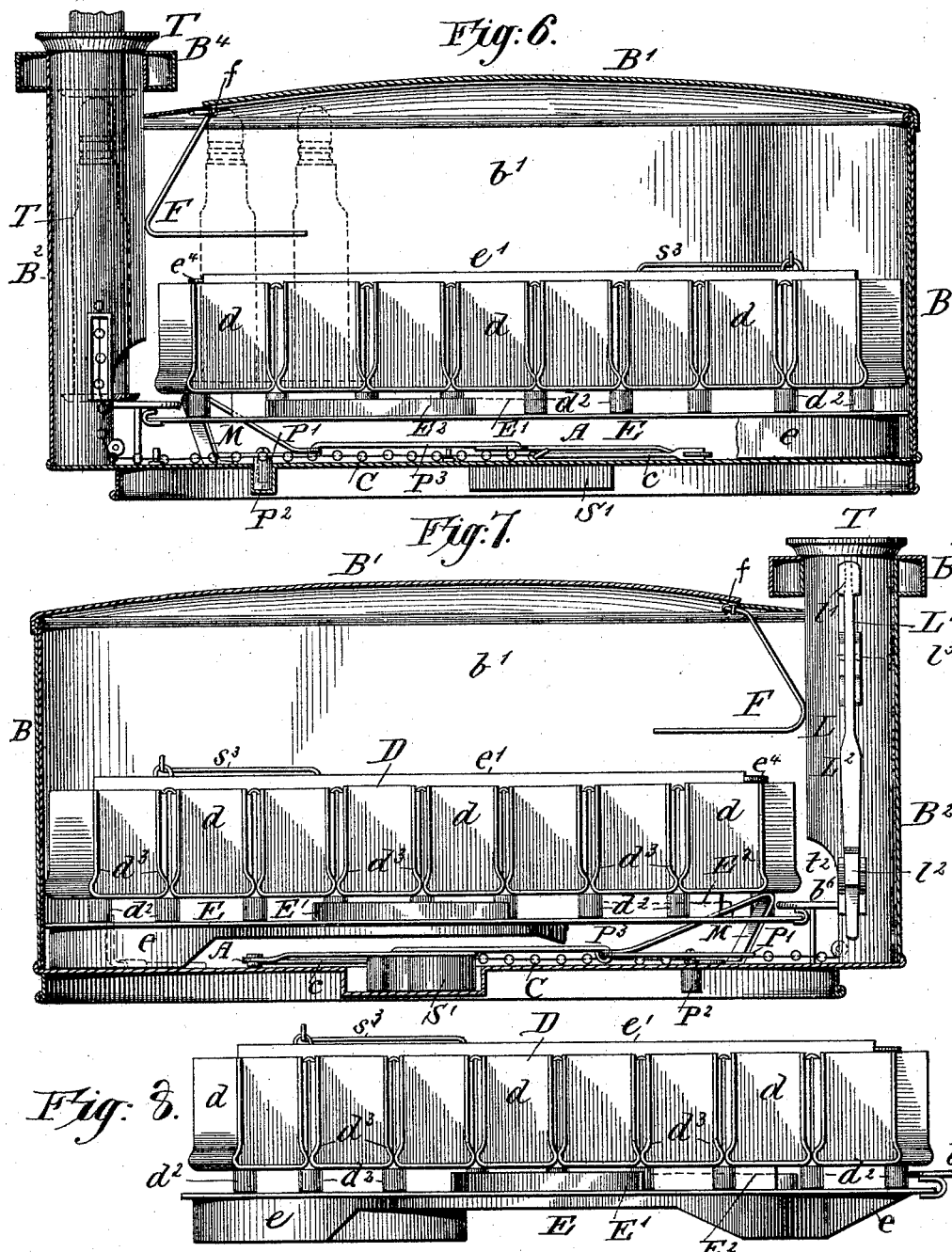

UNITED STATES PATENT OFFICE.

GASPARE MINISINI, OF TURIN, ITALY.

AUTOMATIC POUCH FOR CARTRIDGES.

SPECIFICATION forming part of Letters Patent No. 457,053, dated August 4, 1891.

Application filed March 31, 1890. Serial No. 346,135. (Model.)

*To all whom it may concern:*

Be it known that I, GASPARE MINISINI, a citizen of Italy, residing at Turin, in the county of Turin and Kingdom of Italy, have invented certain new and useful Improvements in Automatic Pouches for Cartridges; and I do hereby declare the following to be a full, clear, and exact description of the invention, such as will enable others skilled in the art to which it appertains to make and use the same, reference being had to the accompanying drawings and to letters of reference marked thereon, which form a part of this specification.

The invention relates to cartridge-holders or boxes adapted to be suspended from a waist-belt; and it has for its object to provide such boxes with means whereby one cartridge after another is fed to and presented at the delivery end of the box ready for withdrawal, the feeding mechanism being operated by the delivery-tube.

The invention has for its further object to provide means for locking the cartridge in the delivery-tube to the latter and in combining therewith means for automatically releasing the said cartridge when the tube is in a given position, whereby the feed mechanism will be operated by the withdrawal of a cartridge.

The invention has for its further object to provide a closed cartridge-box for the purpose of excluding moisture therefrom and to provide means for preventing the cartridges therein from accidentally falling out should the box be left open, the retaining devices being, however, of such a nature as to permit the withdrawal of the cartridges by hand by the application of sufficient power.

To these ends the invention consists in the construction of the cartridge-box; in the combination therewith of a traveling cartridge-carrier, a delivery-tube, and means for feeding the cartridges successively to said tube; in mechanism for operating the feeding devices through the medium of the delivery-tube; in locking devices for locking a cartridge to the tube, and in automatic releasing devices operating to release the cartridge in the tube whenever the latter reaches a given position in the delivery-chamber of the cartridge-box, so that the feeding mechanism will be operated by the withdrawal of a cartridge from the feeding-tube, and, lastly, it consists in structural details and combinations of co-operative parts, as will now be fully described, reference being had to the accompanying drawings, in which—

Figure 1 is a top plan view of a cartridge-box embodying my improvements. Fig. 2 is a rear elevation thereof. Fig. 3 is a longitudinal transverse section on the line $x\ x$ of Fig. 2. Fig. 4 is a like view, the endless-chain carrier being removed. Fig. 5 is a view similar to Fig. 3, the endless-chain carrier and its support being removed to show the chain-propelling mechanism. Figs. 6 and 7 are a front elevation with the front wall of the box removed, and a rear elevation with the rear wall of said box removed. Fig. 8 is a front elevation of the support for the endless cartridge-carrier with the said carrier applied thereto. Fig. 9 is a left-hand elevation of the delivery-tube, and Fig. 10 is a perspective view of the feed-lever.

In the above drawings, B indicates the cartridge-box, which in form and size differs but slightly from those heretofore used, and is also slightly curved, so as to adapt itself to the waist of the marksman. The cartridge-box may be constructed of any suitable material—as, for instance, of sheet metal or other suitable material—and if made of metal is preferably lined with a non-metallic or sound-deadening lining $b'$, of leather, felt, or other suitable material, to prevent the noise or rattling of the cartridges in their movement to the delivery end of the box.

To prevent injury to the ends of the cartridge-box and increase its durability said ends are preferably of curvilinear form—as, for instance, semi-cylindrical—to avoid sharp angles, liable to injury or indentation by contact with hard substances—as, for instance, the gun of the marksman. The cartridge-box is also provided with loops $b$ for the waist-belt, a number of such boxes being strung to said belt, if desired, and with a lid $B'$, hinged thereto, so as to open toward the body of the marksman, said lid being held closed by any suitable means. The bottom $B^3$ of the cartridge-box is so arranged relatively to the vertical walls that the latter will project beyond said bottom, said walls forming a guard to protect said bottom from injury.

At the right-hand or delivery end the cartridge-box B has an approximately semi-cylindrical chamber $B^2$ and vertical recesses $b^2$ $b^3$ on opposite sides thereof, said chamber $B^2$ terminating on top of the cartridge-box with a cross-head $B^4$, that has a cylindrical opening and a radial slot $b^4$ in register with the recesses $b^2$ $b^3$, respectively. The chamber $B^2$ has near its lower end a delivery table or shelf $b^6$, onto which the cartridges are diverted as they pass in front of said chamber through the medium of a spring-actuated guide lever or finger F, pivoted in a bearing $f$ on the under side of the top of the cartridge-box at the delivery end thereof.

The delivery-tube T has a portion of its lower end, facing the cartridge-box B, cut away, as shown at $t^2$, Fig. 9, so that when said tube is pulled out to its full extent a fresh cartridge may enter the chamber and tube. On one side the tube T has a lug $t$, that projects into the vertical radial recess $b^2$ of the chamber $B^2$, to which lug is secured one end of the actuating cord or chain C, that actuates the feeding mechanism, hereinafter to be described, the said chain passing under a roller $B^5$ at the foot of the recess and around guide studs or lugs $b^8$ projecting from the bottom of the cartridge-box.

On the opposite side of tube T is pivoted a catch or pawl P, the nose $p$ of which projects into the tube through a slot formed therein, said pawl being arranged within the vertical radial recess $b^3$ of chamber $B^2$, and serves to support a cartridge in the tube when the latter is pulled out of its chamber. On the same side the tube T is provided with a two-armed lever L, fulcrumed to said tube at $l^3$, the upper arm L' being provided with a lug or nose $l'$, that projects into the tube through a suitable slot. The lower longer arm $L^2$ of the lever L has a stop-shoulder $l^2$, adapted to contact with an abutment-screw $s$, that projects into the vertical lateral recess $b^3$ of the chamber $B^2$, to prevent the tube T from being drawn out of said chamber. The arm $L^2$ of lever L is bent outwardly, so that when the tube T is pulled out of its chamber $B^2$ the inclined upper face of the abutment $l^2$ of the lever-arm $L^2$ will contact with the abutment $s$, and force said arm inwardly and thereby withdraw the lug or nose $l'$ from the tube to release the cartridge therein. A spring S, secured to lever-arm $L^2$, has bearing on the pawl P, and forces the same inwardly, so that the shoulder $p'$ of said pawl is always in position to move under the flange of a cartridge and support the same. Inasmuch as the pawl P is held in its operative position by a yielding pressure it is readily displaced by a cartridge in chamber $B^2$, and pressed outwardly thereby to allow the tube T to return into its normal position and to allow the nose or shoulder $p'$ of the pawl to engage the butt or flange end of said cartridge, the shelf or table $b^6$ being of less width than said butt or flanged end of a cartridge.

The feeding mechanism is arranged on the bottom of the cartridge-box and consists of the following instrumentalities: On a pin $p^6$, projecting from the bottom $B^3$ of the cartridge-box B is pivoted a lever A, that is maintained in a normal position by means of a spring S', and is connected by means of a rod or link $c$ with the actuating-chain C, whose other end is secured to tube T, as hereinbefore stated. Upon a pin $P^2$ is pivoted a bell-crank lever P', that is connected with the lever A by means of a connecting rod or link $P^3$, pivoted to an arm $a$ of lever A, and to the arm $p^2$ of bell-crank lever P'. On the pivot of the rod $P^3$ is loosely mounted the feed-lever M, that is constructed in the form of a hook—that is to say, the feed or actuating portion of the lever is bent at right angles to form the upwardly-projecting hook $m$, the end of which is bent at right angles to form a flange $m'$, that lies under the arm $p^2$ of bell-crank lever P'.

As shown at $m^2$ in Fig. 5, the feed-lever M is curved so that as it recedes from the position shown in dotted lines in Fig. 5 to that shown in full lines in said figure the lever, in passing the head of a chain-link pivot, will be moved inwardly or toward the pivot of the bell-crank lever, and so as to again assume its normal position behind the chain-link pivot as soon as said feed-lever has passed said chain-link pivot ready to carry the same along when the chain C is again pulled upon.

The cartridges are contained in pockets $d$, open at top and front and forming the links of an endless-chain carrier D. The pivots for two successive links consist of an inverted- U-shaped staple, the lower projecting ends of which are preferably secured to a small cylindrical block or tube $d^2$, which blocks or tubes form feet on which the chain is supported and with which the pawl $p^2$ engages to move said chain. The chain-links are constructed of thin sheet metal, and the sides of the pockets near the bottom are crimped or bent inwardly, as shown at $d^3$, to prevent the cartridges from accidentally falling out; but as the side walls of the pockets are more or less elastic the cartridges can be readily withdrawn by pulling upon them with sufficient force to cause said side walls to yield. The endless chain D is supported and guided by a plate E, that has a foot-flange $e$ on its under side of sufficient height to support said plate above the feeding devices, and from the upper face at a proper distance from its edges projects a vertical guide flange or wall $e'$ of the same curvature as the box B, and, as shown, the chamber formed by said vertical wall is preferably divided into pockets $e^2$ for the reception of an additional number of cartridges.

The supporting-plate E has at its right-hand end a slot $e^3$, in which the actuating-lever M works, said lever projecting slightly above the upper face of plate E, so as to engage the foot $d^2$ of the link-pivots. From the upper face of the plate E project two guide-flanges E' E², forming between them and the central wall $e'$ shallow guide-grooves for the foot $d^2$ of the pivot-links, so as to guide the chain properly and hold the same to the guide-wall $e'$. The flange E² has its right-hand end bent outwardly to permit full play to the actuating-lever M; but said flange E² may be dispensed with.

The supporting-plate E may be loosely seated in the cartridge-box B, or it may be detachably connected therewith, so that it may readily be removed, if necessary, and so as to permit of the removal of the cartridges directly from the carrier-chain. This may be done by means of a hook-bolt O sliding in a keeper on the bottom of the cartridge-box and projecting through an L-slot $o$ in the plate E at one end, the opposite end of said plate having bearing under the shelf or delivery-table $b^6$ of the delivery-chamber B². At the left end of the plate E a curved retaining-flange $e^4$ projects from the upper edge of the guide-wall $e'$, that prevents the displacement of the endless chain, the opposite end of said chain being held against such displacement by means of any suitable detachable or yielding retaining device—as, for instance, by means of a spring $s^3$, as shown.

The delivery of the cartridge is effected as follows: Suppose the delivery-tube to be empty and the lever M in contact with the foot $d^2$ of one of the chain-link pivots. By pulling the delivery-tube T out of its chamber B² until the shoulder $l^2$ contacts with the abutment $s$ the chain C will draw the lever A toward the right against the stress of its spring S', and through the link $p^2$ the bell-crank lever P' and lever M are caused to make a quarter-turn (more or less) toward the left and front, thereby moving the endless chain a corresponding distance, which in practice is so adjusted as to bring a pocket or cell $d$ in front of chamber B² at each movement of the pawl. As the cartridge passes in front of the chamber B², the spring-finger F stops its further movement, and as the chain completes its motion the finger guides the cartridge into the chamber B², and the lower end of tube T, which, as heretofore stated, has its side fronting the endless chain cut away. If the tube T is now released, the spring S' will return the bell-crank lever P', the lever M, and the delivery-tube T into their normal positions, the said lever M moving inwardly in passing by the next chain-link pivot, and is thrown behind the same by a spring M' as soon as it has passed the said pivot, ready to move the chain forward again. As the delivery-tube reaches its normal position the catch or pawl P, pressed outwardly by the cartridge, springs under the same and supports it. The delivery-tube being now loaded, if again pulled out a second cartridge is fed to the chamber B² below the first one, and upon the release of the tube the said first cartridge is pushed up by the second one, so as to project from the upper end of the tube sufficiently to catch hold of the same. Thenceforward, instead of pulling upon the tube the projecting cartridge is pulled upon for the twofold purpose of feeding a third cartridge to the chamber B² and for removing the cartridge from the delivery-tube.

As hereinabove stated, the cartridge is held against removal by the lug or nose $l'$ on lever L, and such cartridge is automatically released by the contact of the abutment $l^2$ of the longer arm L² of said lever with the abutment-screw $s$. It will thus be seen that the removal of a cartridge after the delivery-tube is once loaded feeds thereto another cartridge, ready for removal. The last cartridge can of course not be removed from the tube except by holding the same upside down. When the box is not in use, the delivery end of tube T is closed by a plug G, that is connected with the box by a small chain. The spring M', that acts upon the feed-lever M to return the same into its normal position when moved out of it by contact with the foot of a chain-link pivot, is secured at one end to the bottom of the cartridge-box and its free end has bearing on the outer end of said lever.

Although I have described a feed mechanism and a construction of carrier-chain that will answer the purpose, I do not desire to limit myself thereto, as the construction of both may be varied without departing from the nature or spirit of my invention.

Having thus described my invention, what I claim is—

1. The combination, with a cartridge-box provided at one end with a delivery-chamber and a delivery-tube having vertical motion in said chamber, of an endless-chain cartridge-carrier, a propelling mechanism operating on the chain to move the same, a connection between the delivery-tube and propelling mechanism, and a yielding diverting-finger operating on the cartridge to divert the same from the chain carrier to the delivery-chamber as said cartridges move in front of it, for the purpose set forth.

2. A cartridge-box constructed of sheet-metal and of segmental form, the ends of the box being rounded, a substantially semi-cylindrical delivery-chamber at one end of the box, a lining of non-metallic material for said box, a lid, and loops for the reception of a waist-belt, as and for the purpose set forth.

3. The combination, with a cartridge-box, of an endless-chain cartridge-carrier, the links of which chain form pockets for the cartridges, and an elastic retaining device operating to prevent the cartridges from falling out, for the purpose set forth.

4. The combination, with a cartridge-box, of a central chambered guide provided with cells for cartridges, and an endless-chain cartridge-carrier adapted to move around said guide, for the purpose set forth.

5. The combination, with a cartridge-box provided with a delivery-chamber at one end and a delivery-tube having vertical motion in said chamber, of an endless-chain cartridge-carrier, a propelling mechanism for said chain, a spring connected with the propelling mechanism and operating to return the same to a normal position when moved out of it, a connection between the propelling mechanism and delivery-tube for actuating said mechanism when motion is imparted to the tube, and a diverting elastic finger in front of the delivery-chamber, operating to divert the cartridges from the chain into the chamber, substantially as and for the purpose set forth.

6. The combination, with a cartridge-box, of the endless-chain cartridge-carrier, the links of which are constructed to form pockets open at top and front, the sides of said pockets being constructed of elastic sheet metal and provided near the bottom with an inwardly-projecting rib, substantially as and for the purpose set forth.

7. The combination, with a cartridge-box, of the supporting-plate E, provided with a central chamber of the same configuration as the box, an endless-chain cartridge-carrier adapted to move around said chamber, the link-pivots of said chain projecting below the link-pockets and having bearing on plate E, and a propelling mechanism located below the plate and comprising a spring-controlled lever projecting through and working in a slot at one end of the plate and adapted to engage the foot of the chain-link pivots, substantially as and for the purpose set forth.

8. The combination, with a cartridge-box provided at one end with a delivery-chamber $B^2$, the supporting-plate E, provided with the central guide-chamber, and an endless cartridge chain carrier adapted to move around said central chamber, the link-pivots of said chain projecting below the link-pockets and having bearing on the supporting-plate, of a feed mechanism consisting of a spring-controlled feed-lever projecting through and working in a slot at the delivery end of the supporting-plate and adapted to engage the foot of the chain-link pivots, a delivery-tube having vertical motion in the delivery-chamber $B^2$, and a connection between the tube and spring-controlled feed-lever, adapted to operate said lever when the tube is moved upwardly in its chamber, substantially as and for the purpose set forth.

9. The combination, with the cartridge-box B, provided at one end with the delivery-chamber $B^2$, of a delivery-tube having vertical motion in said chamber and a spring-controlled catch or pawl pivoted at the foot of the tube and projecting into the same, for the purpose set forth.

10. The combination, with the cartridge-box B, provided at one end with the delivery-chamber $B^2$ and an abutment arranged near the upper end of said chamber, of a delivery-tube having vertical motion in said chamber, a lever fulcrumed to the tube and provided at one end with a stop-shoulder adapted to engage the said abutment, and at the other with a lug or nose projecting into the tube and adapted to engage the flange of a cartridge therein, the lower arm of said lever bent outwardly so as to engage the abutment to release the cartridge when said tube is moved up, for the purposes set forth.

11. The combination, with the cartridge-box provided at one end with a delivery-chamber and an abutment near the upper end of said chamber, of the feed-tube T, the catch or pawl P, pivoted to the lower end thereof, the nose of said pawl projecting into the tube, and the lever L, also pivoted to said tube, the upper arm of which lever is provided with a lug or nose projecting into the tube and the lower arm of said lever with a stop-shoulder, said lower arm being bent outwardly, and a spring on said lower arm having bearing on the catch or pawl P, for the purposes set forth.

In testimony whereof I affix my signature in presence of two witnesses.

GASPARE MINISINI.

Witnesses:
ENG. MAZETTA, Jr.,
QUAGLIOTH GIOVANNI.